Nov. 18, 1924.                                    1,516,207
S. P. ROCKWELL
HARDNESS TESTING MACHINE
Filed Sept. 11, 1919          2 Sheets-Sheet 2
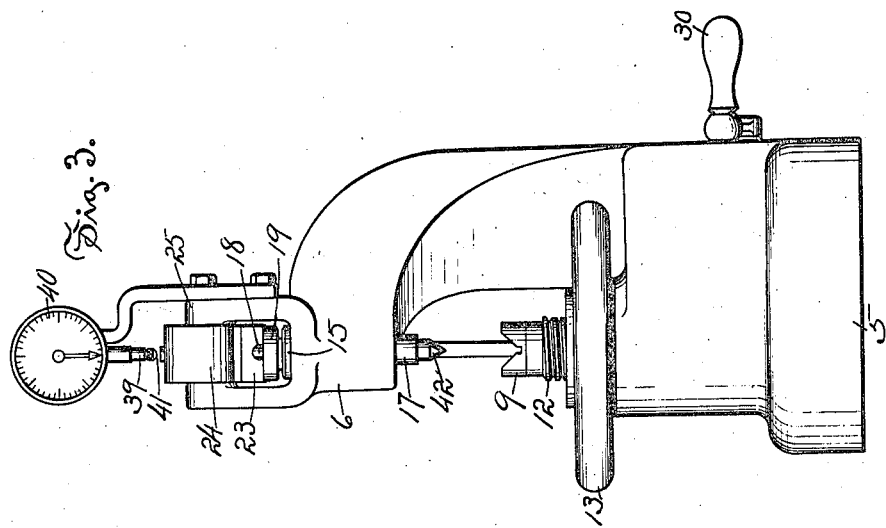
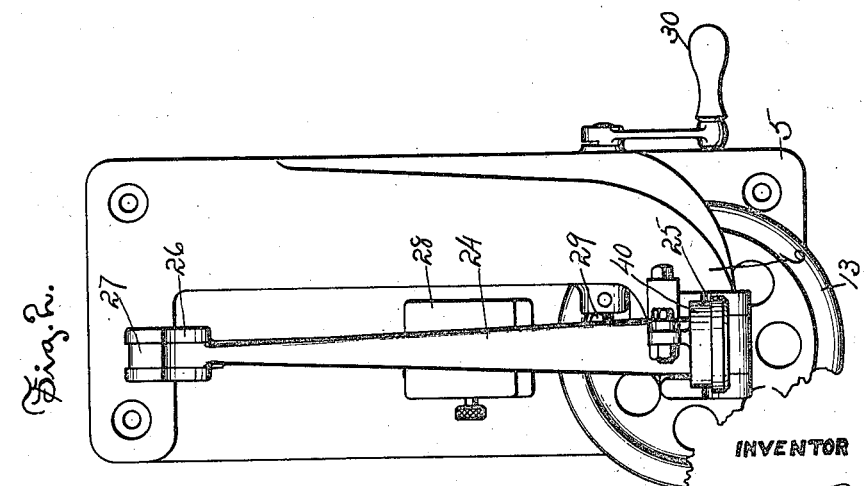
INVENTOR
Stanley P. Rockwell.
by Arthur B. Jenkins.
Attorney.

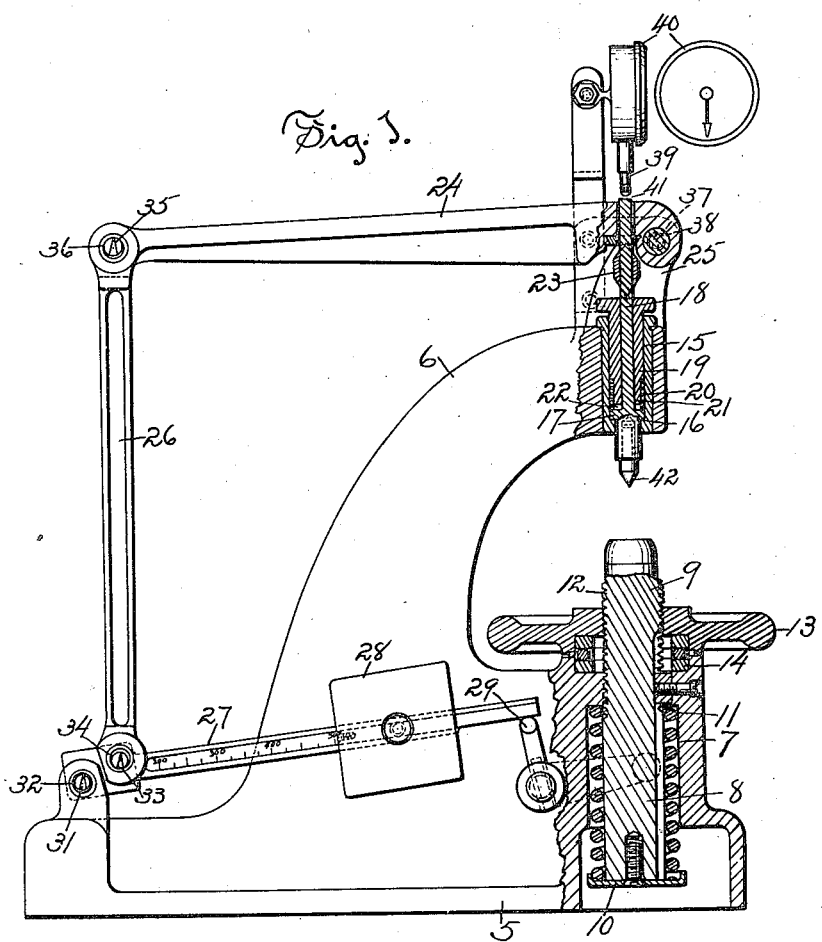

Patented Nov. 18, 1924.

1,516,207

UNITED STATES PATENT OFFICE.

STANLEY P. ROCKWELL, OF SYRACUSE, NEW YORK.

HARDNESS-TESTING MACHINE.

Application filed September 11, 1919. Serial No. 323,094.

*To all whom it may concern:*

Be it known that I, STANLEY P. ROCKWELL, a citizen of the United States, and a resident of Syracuse, in the county of Onondaga and State of New York, have invented an Improved Hardness-Testing Machine, of which the following is a specification.

My invention relates to the class of machines used for testing the hardness of metals more especially, and an object of my invention, among others, is to provide a portable precision machine of this class that shall be especially adapted to test work having variously formed surfaces, that shall be extremely durable, rapid and accurate in operation upon the softer as well as the harder materials, and one that shall not mar excessively or destroy the work being tested.

One form of device embodying my invention and in the construction and use of which the objects herein set out, as well as others, may be attained is illustrated in the accompanying drawings in which—

Figure 1 is a view in side elevation, partially in central vertical section, through a testing machine embodying my invention.

Figure 2 is a top plan view of the same.

Figure 3 is a view in front elevation.

A form of my improved machine that has been developed by me and found to work satisfactorily is illustrated in the drawings herein and comprises a frame including a base 5 and an overhanging support 6 rising from the base to support operative parts of the machine. This frame is preferably of cast metal, the base having an opening 7 extending vertically therein underneath the support 6 and containing said stem or shank 8 of a vertically movable work support 9. A spring support 10 is secured to the bottom end of said stem or shank 8 and the spring thrusts at its upper end against a shoulder 11 formed in the wall of the opening 7 to prevent looseness of the parts. The support 9 has an elevating screw 12 at its upper end to receive an elevating wheel 13 mounted upon ball bearings 14 of any approved form interposed between the under surface of the wheel and the upper side of the base. The stem 8 is splined to the base so that it has a vertical movement therein but no rotative movement.

A bushing 15 is secured in a hole extending through the support 6 near its upper end, this bushing having a shouldered opening extending vertically therethrough, said shoulder 16 receiving a flange on the head 17 of a testing rod or tester 18 extending upwardly from the head through a testing sleeve 19 located within the bushing 15 and having a shoulder seated upon a spring 20 that in turn rests upon the flange hereinbefore mentioned on the head 17. The reduced end 21 of the sleeve extends within the spring 20 and to a point near the hereinbefore mentioned flange, there being a slight space 22 to be hereinafter referred to between the reduced end of the sleeve and said flange.

A double-knife-edged block 23 is seated with its lower knife edge upon the flanged upper end of the sleeve 19, preferably in a notch therein, the upper knife edge of said block supporting a testing lever 24 pivotally mounted between ears 25 projecting upwardly from the upper end of the support 6, said lever extending backwardly and having a connecting rod 26 connecting it with a weight beam 27 pivotally mounted on the base and supporting a testing weight 28 slidably mounted on said beam. The end of the weight beam is supported by a crank arm 29 pivotally mounted on the base and having a crank handle 30 by means of which the crank arm may be operated to release the weight beam, in one method of operation. It may be here noted that the construction of the testing rod 18 and its cooperating and supporting parts hereinbefore mentioned permits initial movement of said rod and the penetrator carried thereby without effect upon said testing weight or member, whether said crank arm be used or not.

The lever 24 and beam 27 and the connecting rod 26 are connected and supported on knife bearings, the bearings 31 of the weight beam being received within openings 32 in the base of the machine, the bearings 33 on the weight beam and for the lower end of the connecting rod being received within openings 34 in said connecting rod, the bearings 35 on the lever 24 being received within openings 36 in the upper end of the connecting rod, and the knife bearings 37 at the opposite end of the testing lever being received within openings 38 in the ears 25. The contacting surfaces of these knife bearings are preferably hardened and said bearings are arranged to reduce friction to a minimum.

The testing rod 18 extends upwardly through an opening in the block 23 and through the lever 24, the upper end of said testing rod, in the construction herein shown, being located underneath and a slight distance from the lower end of a plunger 39 of an indicator 40 that is preferably of the pointer or hand type and having a dial by means of which the degree of movement of the hand or pointer may be noted. The space 41 between the upper end of the testing rod and the lower end of the plunger 39, when such space is provided for, is less than the space 22 between the reduced end 21 of the sleeve 19 and the flange on the head 17 for a purpose to be hereinafter stated. It is not essential, however, to the operation of the machine that this space 41 shall exist, as the machine will be operative without such space, and, in fact, in some cases it may be found of advantage to eliminate such space, or interpose such device as may seem advisable. In fact, should the rod 18 and plunger 39 be made of one piece an operative structure will result. The head 17 is supplied with a testing point 42.

In the operation of the machine the article to be tested is placed on the work support 9, that may be notched for round work, or that may be flat for flat work, and the work is raised by the hand wheel 13 until it comes in contact with the testing point.

At this time a minor pressure of the point 42 to the work is applied by a continued rotation of the hand wheel that forces said point to move against the tension of the spring 20, and this rotation of the hand wheel is continued until the plunger 18 is moved to a definitely indexed position that may be indicated in any desired manner, as by the dial 40, in which indexed position the flange on the head 17 on the testing rod will be lifted from its seat on the shoulder 16, but not enough to touch the lower end of the sleeve 19. This will cause the spring 20 to exert its full pressure upon the testing point at each testing operation, and the same pressure of the testing point upon each piece of work will thereby be obtained at each testing operation, this being necessary to secure accurate results. This minor pressure, thus obtained, will firmly seat the testing piece and cause the testing point to break through the slight scale or decarburization on the surface of the work and to make firm contact with the true metal beneath. Here it may be noted, as above described, that the spring 20 insures the same degree of pressure by use of the wheel 13 at each operation, which pressure, is resisted by the point 42 and the spring 20. A variation in the minor pressure would otherwise result where is attempted to be obtained by the use of the hand wheel only by reason of the inability of a person, or of different persons, to apply the same force to the wheel 13 at different operations. So long as the same tension is placed on the spring 20 at each testing operation the amount of such tension will be immaterial, provided the spring is compressed sufficiently to permit the necessary and unrestricted movement of the weight beam 27.

The hand wheel is operated to bring the spring 20 fully into play until the space 41 is closed, when such space is provided, and to place the proper predetermined tension upon the spring 20, this operation moving the indicating hand to a testing point that may be denoted by zero on the dial of the indicator. In this operation the flanges on the head 17 approach the lower end of the sleeve 19 but the space 22 should not be closed. Moreover, the head 17 in rising leaves a space underneath the flange on the head 17, between the lower face of said flange and shoulder 16. The parts are now in position for application of the major pressure that is applied by releasing the crank arm 29 from the beam 27, this causing full effect of the weight to be exerted through the beam 27, rod 26, lever 24 and block 23 upon the sleeve 19 that is now moved into contact with the flange on the head 17, and as a consequence, the full effect of the weight is exerted upon the testing point 42 that is driven thereby into the work to a degree depending upon the hardness of the material of which the work is composed and the position of the weight 28 on the beam 27, this movement, however, not closing the space underneath the flange on the head 17.

The dial hand denotes the degree of movement of the penetrator caused by the pressure of the weight and the major load beyond the position occupied by the penetrator after pressure of the minor load, and from which additional depth of penetration the degree of hardness of different pieces of metal may be determined. In carrying the operation to a conclusion the degree of hardness is determined by direct reading upon the dial, in which operation the force of the weight is released, as with such weight acting upon the piece being tested, the degree of movement of the indicator hand will be influenced by the "spring" of the frame of the machine, the elasticity of the metal shape of the piece being tested and of other parts, so that the indicator hand, under such conditions, will be moved to a greater extent than that denoting the penetration by the testing point, and which is required to indicate the exact degree of hardness. For instance, when the weight is applied the degree of movement of the indicator hand may be noted, and when the force of the weight is released the indicator hand will travel backwardly to the true indicating position, the return of the metal comprising the frame, the piece being tested and other parts to normal conditions, effecting this backward movement of the indicator hand. As an example, the piece to be tested having been forced, by the operation of the wheel 13 against the testing point, until the spring 20 is brought into action, the wheel 13 is thereafter moved until the indicator hand registers at a point—say zero—this being the application of the minor pressure. The weight now being released to apply the major pressure the indicator hand may move to a point on the dial—say fifty—after which the force of the weight being removed the indicator hand will travel backwardly to a point—say twenty-five—and this point is the one to be taken into consideration in determining the actual degree of hardness of the piece being tested, as when the major pressure of the weight is removed, (the minor pressure of the spring 20 being still applied) the spring of the frame and of the metal piece being tested and other parts will cause them to return to the conditions which they had when the zero reading was taken and the dial will, therefore, indicate the amount of penetration of the testing point into the piece being tested.

I claim—

1. A device of the character indicated including a work support, a penetrator operatively positioned with respect to said support, a member operatively connected with the penetrator to apply pressure thereto, means to permit initial movement of the penetrator when opposed by the resistance of the work on the work support without effect upon said member, means for supporting said member to relieve it from the effects of said pressure, and means for releasing said member for the application of said pressure thereto and to the penetrator.

2. A device of the character indicated including a work support, a penetrator operatively positioned with respect to said support, a weighted beam operatively connected with the penetrator, means to permit initial movement of the penetrator when opposed by the resistance of the work on the work support without effect upon the weight, means for supporting said beam to relieve it from the effects of the weight, and means for releasing the beam for the application of the weight to the penetrator.

3. A device of the character indicated including a work support, a penetrator operatively positioned with respect to said work support, a member to transmit pressure to said penetrator, means to permit initial movement of the penetrator under resistance of the work on the work support without effect upon said member, a system of levers connecting said member and said penetrator, said levers embodying a pivoted connection comprising a knife-edge bearing on one member receiving the opposite member, and means for releasing said pressure transmitting member for the application of said pressure through said levers to said penetrator.

4. A device of the character indicated including a work support, a penetrator operatively positioned with respect to said support, a testing lever operatively connected with said penetrator, a weighted beam operatively connected with the testing beam, means to permit initial movement of the penetrator under force of the work support without effect upon said weighted beam, means for supporting the weighted lever to relieve it from the effects of force applied thereto, a connecting rod extending between the weighted beam and testing lever, and means for releasing said beam for the application of force to the weighted beam.

5. A device of the character indicated including a work support, a penetrator operatively positioned with respect to said support, a pivotally mounted testing lever connected with said penetrator at a point near the fulcrum of said lever, a connecting rod pivotally attached to said lever at a point relatively far removed from its fulcrum, a pivotally mounted weight beam, connected to said rod at a point near the fulcrum of said beam, knife edge bearings located upon said beam and rod and engaging recesses within the recessed member opposite to that on which said knife edge bearings are located, and means for applying power to the weight lever.

6. A device of the character indicated including a work support, a penetrator operatively positioned with respect to the work support, a member operatively connected with the penetrator to apply pressure thereto, means to permit initial movement of the penetrator under resistance of the work on the work support without effect upon said member, a crank arm to support said member to relieve it from the effect of said pressure, and means connected with said arm to effect operation thereof to release said member for application of said pressure thereto and to the penetrator.

7. A device of the character indicated including a work support, a testing lever, means for applying force to the testing lever, an indicator, a testing rod supporting a testing point, said rod being operatively supported with respect to said indicator, a member resiliently connected with said rod, and an operative connection between said member and said testing lever.

8. A device of the character indicated including a work support, a testing lever, means for applying force to said lever, an indicator, a testing rod supporting a testing point, said rod being operatively supported with respect to said indicator, a member resiliently connected with said rod, and a double knife edged block resting between said lever and said member to apply force to the latter.

9. A device of the character indicated including a work support, a testing lever, means for applying force to the testing lever, an indicator, a testing rod supporting a testing point, said rod being operatively supported with respect to said indicator, a member operatively connected with said rod for operation thereof, and a block seated upon said member and receiving the thrust of said lever, said block having a hole through which said rod extends.

10. A device of the character indicated including a work support, a testing lever, means for applying force to the testing lever, an indicator, a testing sleeve, a testing rod extending through said testing sleeve in operative position with respect to said indicator, and a block interposed between said testing sleeve and said testing lever and having an opening through which said rod extends.

11. A device of the character indicated including a work support, a testing lever, means for applying force to the testing lever, an indicator, a testing rod having its end spaced a slight distance from an operative member of said indicator, and a member resiliently connected with said rod for transmitting movement to said rod but normally spaced a slight distance therefrom.

12. A device of the character indicated including a work support, a testing lever, means for applying force to said lever, an indicator, a testing rod supported with its end spaced a slight distance from the end of said indicator, and a testing member normally spaced a distance from said testing rod slightly greater than the distance between the testing rod and indicator.

13. A device of the character indicated including a work support, a tester support located above the work support and having a lipped opening, a testing sleeve located within said opening, a shouldered testing rod projecting through said sleeve, a spring thrusting between the shoulder on the rod and said sleeve, and an indicator supported in operative relation with respect to said rod.

14. A device of the character indicated including a work support, a testing lever pivotally mounted above said support, a testing sleeve operatively positioned with respect to said lever, a two-edged block interposed between said lever and said sleeve, a testing rod projecting through said sleeve, through said block and through said lever and resiliently connected with said sleeve, and an indicator operatively positioned with respect to said rod.

15. A testing device for testing hardness including a frame, a work support mounted on the frame, a tester movably mounted in the frame, means for applying force to said tester for testing purposes, and a second means for subjecting said tester to force for testing purposes, said tester being mounted to move initially independently of said second force applying means.

16. A testing device for testing hardness including a frame, a work support operatively mounted on the frame, a tester movably mounted on the frame, means for applying force to said tester for testing purposes, an indicator operatively positioned with respect to said tester, means for mounting said tester so that it will move initially independently of said force applying means so as to apply a minor load, and means for operating said work support.

17. A testing device for measuring penetration hardness including a frame, a penetrator movably mounted on the frame, means for applying force to the penetrator, a lever loosely connected with the penetrator to apply other force thereto, a weight beam adapted to support a weight, a rod connecting said beam and lever, and a work support located in cooperative position with respect to said penetrator.

18. A testing device for measuring penetration hardness including a frame, a penetrator supported by said frame, a lever loosely connected with said penetrator to apply force thereto and to permit initial movement of the penetrator, said penetrator being mounted for movement independently of said lever, an indicator supported for operation by said penetrator, a weight beam adapted to receive a weight, means for connecting said weight beam and lever, and means to receive a piece of work in cooperative relation with respect to said penetrator.

19. A testing device for measuring penetration hardness including a work support, a penetrator operatively positioned with respect to said support, a member operatively connected with the penetrator to apply force thereto, an indicator, and a loose connection between the penetrator and indicator to permit movement of said penetrator longitudinally and independently of the indicator and to cause the latter to register the amount of movement of the penetrator between different points.

20. A testing device for measuring penetration hardness including a work support, a testing lever, means for applying a major force to the testing lever, an indicator, a penetrator movably supported and operatively connected with said indicator, an operative connection between said penetrator and said lever, and means independent of the major force applying means for applying a minor force to said penetrator.

21. A testing device for measuring penetration hardness including a work support and a penetrator relatively positioned to receive a test piece, means for applying a minor pressure to one of said members by moving the test piece into testing relation with the penetrator, means for independently applying a major and different pressure to one of said members, and an indicator to denote the degrees of movement of said penetrator.

22. A testing device for measuring penetration hardness including a work supporting member and a penetrator member relatively positioned to receive a testing piece, means for applying a minor pressure to one of said members, an indicator operatively connected with one of said members to denote its movement, and a major pressure means movable independently of either of said members but arranged to be connected therewith to transmit its force thereto.

23. A testing device for measuring penetration hardness including a work support, a testing sleeve, means for applying force to the testing sleeve, an indicator, a penetrator movably supported and operatively connected with said indicator and movable initially with relation to said testing sleeve, and means for transmitting the force applied to the testing sleeve to said penetrator.

24. A testing device for measuring penetration hardness including a work support, a penetrator relatively positioned with respect to the work support, a member operatively connected with the penetrator to apply a minor force thereto when the work support is moved, an indicator, a connection between the indicator and the penetrator for determining the amount of movement of the latter, and means for applying a major force to the penetrator independently of the application of the minor force.

25. A testing device for measuring penetration hardness including a work support and a penetrator relatively positioned to receive a test piece, means connected to one of said members for applying a minor pressure to said member, when the test piece is brought into testing relation with the penetrator, means for applying a major and different pressure to one of said members, and an indicator to denote the degree of movement of said penetrator from the bottom of the depression caused by the minor pressure to the bottom of the depression caused by the force applied by the major pressure.

26. A testing device of the character described for testing penetration hardness including a frame, a work support mounted on the frame, a tester movably mounted to press completely upon a piece of work on said work support when testing, means controlled by the movement of the work support for applying a minor pressure of the same degree to different pieces of work on said work support, different means for independently applying a major pressure to said pieces of work and means connected with said tester for measuring the penetration due to the application of the major pressure.

27. A testing device of the character described for testing penetration hardness including a frame, a work support mounted on the frame, a tester movably mounted to press completely upon a piece of work on said work support when testing, means for applying a minor pressure of the same degree to the tester so as to apply the same minor pressure to different pieces of work on said work support, means for applying a major pressure independently of said minor pressure to said pieces of work, means for removing said major pressure, and means for solely indicating the degree of movement of the tester during application of the major pressure and during removal of said major pressure.

28. A testing device of the character described for testing penetration hardness including a work supporting member, a penetrator member relatively positioned to receive a testing piece, mechanism for applying a minor pressure to one of said members, different mechanism for independently applying a major and different pressure to one of said members, and an indicator connected with the penetrator member to independently indicate the positions of the penetrator under the minor and major pressures.

29. A testing device of the character described for testing penetration hardness including a work supporting member, a penetrator member relatively positioned to receive a testing piece, an indicator operatively connected with said penetrator, means controlled by the movement of the work support for applying a minor pressure to one of said members and operating the indicator to denote the degree of penetration due to said pressure, and different means for independently applying a major and different pressure to one of said members and operating the indicator to separately indicate the degree of penetration due to the said major pressure.

30. A device for testing penetration hardness including a work support, a loaded yielding penetrator operatively positioned with respect to said support, means for moving said work support toward said penetrator, said penetrator being provided with means for applying a minor load of predetermined amount thereto when the piece under test is brought into testing relation with the penetrator by the movement of the work support, and an indicator for indicating the movement of the penetrator while the piece under test is subjected to the minor load.

31. A device for testing penetration hardness including a work support, a penetrator operatively positioned with respect to said support, means for moving one of said members toward and from the other, one of said members being provided with means for applying a minor load of definite amount thereto, when the piece under test is brought into testing relation with the penetrator, an indicator for indicating the movement of the penetrator while the piece under test is subjected to said minor load, means for applying a major load of predetermined amount to said penetrator, and means for removing said major load without removing the minor load, said indicator indicating the penetration upon removal of the major load and while the minor load is applied.

32. A device of the character indicated including a work support, a penetrator, means for moving one of said members toward the other, a sleeve, a spring between the sleeve and the penetrator adapted to apply a minor load of definite amount to said penetrator when the work is brought into testing relation with the penetrator, and means for applying a major load to and removing its load from said sleeve.

33. A device of the character indicated including a work support, a penetrator, means for moving one of said members toward the other, a sleeve, a spring between the sleeve and the penetrator adapted to apply a minor load of definite amount to said penetrator when the work is brought into testing relation with the penetrator, means for applying a major load to and removing its load from said sleeve, and an indicator arranged to indicate the amount of penetration by said penetrator under the progressive action of said loads.

34. A device for testing penetration hardness including a work supporting member, a non-rotating penetrator member operatively positioned with respect to said supporting member, means for decreasing the space between said members, means for automatically applying a minor load of definite amount to one of said members when the piece under test is brought into testing relation with the penetrator, and means for applying a major load to and removing its load from said members.

STANLEY P. ROCKWELL.